United States Patent [19]

Agapiou et al.

[11] Patent Number: 5,371,053
[45] Date of Patent: Dec. 6, 1994

[54] PROCESS FOR DEACTIVATING ZIEGLER-NATTA AND METALLOCENE CATALYSTS

[75] Inventors: Agapios K. Agapiou, Humble; Steve K. Ackerman, Baytown; David M. LaBorde, Huffman; Marc L. DeChellis, Houston, all of Tex.

[73] Assignee: Exxon Chemical Patents Inc., Linden, N.J.

[21] Appl. No.: 64,288

[22] Filed: May 18, 1993

[51] Int. Cl.$^5$ .................. B01J 20/34; B01J 38/02
[52] U.S. Cl. .................. 502/56; 502/107; 502/152; 588/223; 588/228; 588/234; 588/235
[58] Field of Search .......... 502/56, 107, 152; 588/223, 228, 234, 235

[56] References Cited

U.S. PATENT DOCUMENTS

| | | | |
|---|---|---|---|
| 4,314,053 | 2/1982 | Lin et al. | 528/483 |
| 4,450,098 | 5/1984 | Lambertus et al. | 502/107 |
| 4,649,128 | 3/1987 | Rekers et al. | 502/159 |

FOREIGN PATENT DOCUMENTS

| | | | |
|---|---|---|---|
| 246293 | 3/1963 | Australia | 502/56 |
| 0120501A1 | 10/1984 | European Pat. Off. | |
| 0471497A1 | 8/1991 | European Pat. Off. | |
| 0102939 | 11/1983 | Japan | 502/56 |
| 8103701 | 3/1983 | Netherlands | |

Primary Examiner—Asok Pal
Attorney, Agent, or Firm—D. W. Miller

[57] ABSTRACT

A process for deactivating Ziegler-Natta and metallocene catalysts or catalyst systems "such systems are typically used for olefin polymerization". The process includes heating the active catalyst or catalyst system to a temperature sufficient to drive off volatile constituents, and to form complexes and compounds that are non-reactive or less reactive with ambient air than the active catalyst or catalyst system. The process includes steps for safe deactivation including scrubbing to substantially eliminate corrosive compounds, and burning volatile chemicals in a flare.

This process essentially eliminates the production of hazardous classification waste from conventional water catalyst deactivation techniques.

9 Claims, 2 Drawing Sheets

PROCESS FOR DEACTIVATING ZIEGLER-NATTA AND METALLOCENE CATALYSTS

TECHNICAL FIELD

The present invention relates generally to processes for catalyst deactivation. More specifically, the present invention concerns a process for deactivating transition metal catalysts "(typically used to polymerize olefins)", employing thermal decomposition and air oxidation.

BACKGROUND

There are many processes for manufacturing polyolefins such as polyethylene, polypropylene, ethylene propylene rubber. Catalysts or initiators convert olefins, and optionally comonomers, into polyolefins. Development of new, better performing, less costly polyolefins has often been a result of catalyst development.

Polyolefin catalysts, such as Ziegler-Natta catalysts systems, are transition metal compounds like transition metal halides or transition metal alkoxy halides. These transition metal compounds are co-catalyzed with aluminum alkyls to form a catalyst system. It is estimated that close to 9,000 tons of Ziegler-Natta type catalysts were manufactured in 1992 to meet the worldwide capacity demand for polyolefins.

Metallocene compounds co-catalyzed with alumoxane compounds form the basis for another polyolefin catalyst system based on transition metal compounds and aluminum compounds. Examples of the latter are U.S. Pat. No. 4,937,299 and EPA 0-129368 to Ewen, et al. and U.S. Pat. No. 4,808,561 to Welborn, Jr.

Catalysts tend to be active chemical compounds and those most often used for polyolefin formation are based on one or more transition metals. Many such catalysts are pyrophoric, igniting on contact with air and/or moisture. The active chemical characteristics of these catalysts make them desirable and useful as polymerization catalysts.

Deactivation and subsequent disposal of active catalysts is a problem. This problem is caused by catalyst manufacture that results in catalysts that do not meet the manufacturer's specifications, or even meeting those specifications, they may not meet the performance specifications of the catalyst user. Also, after polymerization, "heels" of active catalyst remain after polymer discharge from a reaction vessel. These "heels" are catalysts that are still active. Additionally, under normal manufacturing techniques, more catalysts will be produced than used. All of these situations result in active catalysts that must be disposed of safely.

Catalyst deactivation techniques are known. For example, flooding with water, alcohol, or similar liquid treatments cause the active chemicals of the catalyst to react violently with the flooding medium and/or themselves, resulting in inert or relatively inert substances. The flooding medium may be removed from the now inert or relatively inert catalyst components or alternatively the flooding medium and the deactivated catalyst are kept together for disposal.

Often after such flooding, the catalyst is no longer pyrophoric, and therefore relatively safe for disposal. However, the flooding medium after catalyst contact, contains components that result from contact with and reaction with the catalyst. The flooding medium, after catalyst contact, may have a flash point that is lowered by volatile organic chemicals and a pH that is slightly to highly acidic.

A waste stream with a low flash point and low pH, will likely be categorized as hazardous. Such hazardous categorization will result in increased disposal costs. Such costs are escalating as environmental laws become more stringent.

In addition to flooding, other catalyst deactivation techniques, such as by exposure to air/oxygen, may be used. This technique, like flooding, causes the active chemicals of the catalyst to react violently, resulting in inert or relatively inert substances. This method, because of the violent reaction, is useful only for very small amounts of catalyst. This method may be preferably used for small amounts of catalyst, such as might be remaining on vessel walls after removal of a batch of catalyst.

It would be desirable to have a process that would allow catalyst deactivation at lower cost and fewer potential environmental concerns than previous deactivation methods.

SUMMARY

Our invention is directed to a process for deactivating transition metal catalysts, catalyst systems or catalyst components (hereafter referred to as "catalyst(s) Such catalysts are typically used to polymerize olefins."). The process comprises heating, preferably carried out in the absence of air, (including elemental oxygen and water vapor) as air may cause spontaneous ignition or violent reaction when contacting many transition metal catalysts. An environment, such as nitrogen, argon, or a vacuum, that is substantially non-reactive to the catalyst is preferred. In other words, the catalyst should be heated in an environment which is substantially unreactive (inert) with the catalyst (e.g., a vacuum or nitrogen atmosphere).

The heating should be conducted at or above a temperature sufficient to decompose or render less chemically active, the active chemical compounds of the catalyst, and/or place them in a state where they do not react violently or ignite upon contact with air and/or water. The heating step should also volatilize volatile compounds, such as solvents used in catalyst manufacture.

The heating step should be carried out in a manner that will minimize the formation of unwanted chemicals such as halogenated hydrocarbons. Heating can be safely carried out in a nitrogen atmosphere at a temperature between about 30° C. and about 1000° C., preferably between about 30° C. and 300° C. Exposing the heated catalyst to air, air with water vapor, steam or water (hereinafter "air"), may be safely conducted after the heating step.

Heating can be carried out in several ways. A preferred method is stepwise or gradual heating. A first step may be to temperatures of from about 40° to about 110° C., then holding or maintaining a temperature high enough to drive off volatiles, but not so high that substantial quantities of undesirable compounds, such as halogenated hydrocarbons or elemental chlorine, are formed.

A second step comprises heating gradually from the temperature of the first step to a temperature generally up to at least 150° C. A third step comprises heating to a temperature that is selected by determining the temperature needed to convert active catalyst compounds to non-reactive or relatively non-reactive compounds.

Each temperature step is conducted over a time period and temperature to insure that, after the final heating step and holding step, substantially all of the volatiles are driven off, a minimum of unwanted compounds are generated, and the catalyst, catalyst system or catalyst components are substantially deactivated.

Exposure of the catalyst to air may further convert any remaining partially inactivated chemical compounds to, for instance, oxides which are substantially non-reactive to ambient air.

Accordingly, our invention permits active transition metal polyolefin catalyst deactivation, where products driven off during heating may be vented to a flare, or some other means of safely disposing of the products well known to those in the relevant art. The solids remaining after heating are substantially unreactive, or if somewhat reactive, will react safely with elemental oxygen and water vapor in air to further move them to a substantially unreactive state. The solids may then be disposed of safely.

These, and other features, aspects and advantages of the present invention will become better understood with reference to the following description and appended claims.

BRIEF DESCRIPTION OF THE DRAWINGS

For a better understanding of the present invention, reference is made to the drawings, for which.

Figure 1:
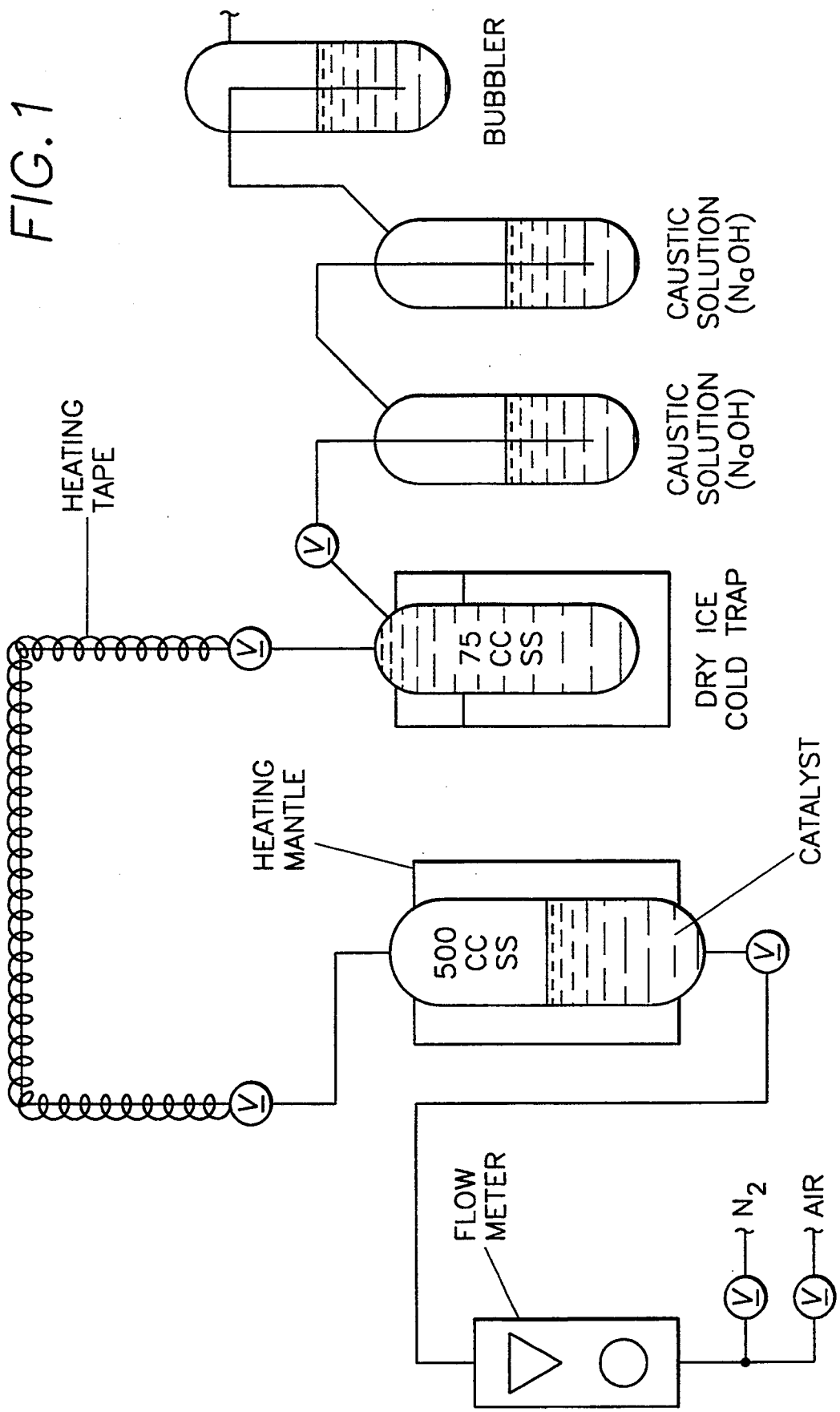
FIG. 1 shows a schematic drawing of a dry catalyst deactivation process, incorporating a preferred embodiment of the present invention relating to Experiment I.

These drawings are not intended to in any way define the present invention, but are provided solely for the purpose of illustrating certain preferred embodiments and applications of the present invention.

DESCRIPTION

The present invention concerns a deactivation process for transition metal catalysts, catalyst systems, or catalyst components by heating an active catalyst in an inert environment. Following is a detailed description of certain preferred deactivation processes. Those skilled in the art will appreciate that numerous modifications to these preferred embodiments can be made without departing from the scope of the invention. To the extent that our description is specific, this is solely for the purpose of illustrating preferred embodiments of our invention and should not be taken as limiting our invention to these specific embodiments.

Overview

A process according to the present invention for deactivating a transition metal catalyst, comprises heating the catalyst in an environment substantially free from air, especially elemental oxygen and water vapor that may be contained in air. Heating causes the active, corrosive, volatile compounds contained in a catalyst to become totally or partially inactive or inert, non-corrosive or less corrosive, and wholly or partially volatilizes, volatile compounds. Care must be taken that the rise in temperature from ambient conditions be controlled to drive off substantially all hydrocarbons or other volatile organic chemicals. If the temperature rise is not controlled, the catalyst will still become deactivated, but a significant possibility of creation of halogenated hydrocarbons or other by-products exists. Such halogenated hydrocarbons present greater difficulty of disposition than volatile non-halogenated hydrocarbons.

After the heating step is complete, the catalyst may be safely exposed to air, air including water vapor, steam, or water. Moreover, exposure to air, after heating can be helpful in converting compounds or complexes formed by heating to form oxides, or hydroxides, through reaction with elemental oxygen and water vapor in air. Such oxides or hydroxides, or other substantially inert or nearly inert, non-reactive or nearly non-reactive, non-corrosive or substantially non-corrosive substances, are formed through their reaction with air.

Transition metal catalyst preparation is well-known in the art. Examples of catalysts and/or catalyst systems useful for polyolefin manufacture include Ziegler-Natta and Metallocene-Alumoxane types. A traditional Ziegler-Natta catalyst is a system containing titanium and/or vanadium as the transition metals normally supported on silica and/or $MgCl_2$ and sometimes incorporating electron donors and aluminum alkyls. A metallocene is an organometallic coordination (catalyst) compound obtained as a cyclopentadienyl derivative of a transition metal or metal halide. An alumoxane is an organo aluminum compound, and is used as a co-catalyst with the metallocene. Many of these catalysts or catalyst systems, or even their components ignite spontaneously in air, react violently with water, acids, alcohols, halogens and amines. The present invention shall be generally referred to herein as a catalyst deactivation process.

A preferred embodiment of our invention is intended to cover a substantially dry deactivation of all transition metal catalysts, including prepolymerized catalyst types, to minimize disposal costs. This process does not require the use of water or other liquids.

In an alternative embodiment, controlled amounts of water vapor, or controlled amounts of air or elemental oxygen, or combinations of these reactants may be added during the heating, or in place of the heating step. Further, amounts of any material reactive with the catalyst may be added. Such an addition may cause an exothermic reaction with the catalyst or catalyst system which could drive off volatile compounds. However, the invention can assume many other embodiments and be used for a deactivation of variety of catalysts. To the extent that the following description details a specific embodiment of a catalyst deactivation process, this is by way of illustration rather than limitation.

In one embodiment, a Ziegler-Natta catalyst is manufactured by techniques well known in the industry, and may be prepared by forming a precursor from; a magnesium compound, a titanium compound, and an electron donor compound, diluting the precursor with an inert carrier and activating with an organoaluminum compound as described in European Patent Application EP 369 436 A2. Metallocene-alumoxane catalysts can be prepared by reacting methylalumoxane (MAO) with dehydrated silica ($SiO_2$) and contacting the $SiO_2$—MAO complex with a metallocene. Metallocene-alumoxane catalyst synthesis or manufacture is described in U.S. Pat. Nos. 4,752,597 and 4,808,561, and in published European application EP-A-123-368 B1. Deactivation of such catalysts or catalyst systems prior to disposal, is among the objects of this invention.

In general, we have found that an active catalyst, maintained in an inert or non-reactive environment that is substantially unreactive with the catalyst, and heated, will be deactivated by thermally decomposing or volatilizing the catalyst components. By substantially unreactive or inert with the catalyst, or inert to the catalyst, we intend that the catalyst will not react with the environment. Such an environment can be a vacuum or a range of Noble gasses, however nitrogen or argon is preferred.

The unreactive environment is chosen to minimize production of corrosive or harmful compounds during heating, and minimizes the potential of auto ignition or violent reaction. Examples of environments that will be substantially unreactive with the catalyst are a vacuum, the noble gasses; nitrogen, argon, krypton, xenon, neon, and helium.

During heating, the temperature is raised to a level to totally or partially volatilize volatile species such as, for example; inert hydrocarbons having for instance carbon numbers of 2 to 12, hydrogen, entrained solvents, ethylene, hexene, isopentane, tetrahydrofuran and gaseous HCl or $Cl_2$.

During the heating, volatile substances are evolved. It is important that the heating be carried out in a manner to minimize or eliminate reactions that could produce corrosive or harmful products. Accordingly, in a preferred embodiment, a slow rise in temperature such as 10° C. per hour until the temperature reaches from about 150° C. to about 250° C.

Substances evolved must be safely disposed of, for instance, by scrubbing or neutralizing any acidic materials, and burning any volatile substances such that the combustion products of these substances are substantially non-hazardous or non-polluting. The volatiles and/or gases may be continuously purged to a flare during the heating process, or sent to a flare after the heating is substantially complete.

In a more preferred embodiment, a step-wise temperature elevation is used. The temperature is elevated gradually in the first step, to about 100° C. In the second step, the temperature is raised to about 150° C., and the third step, to about 200° C. The highest temperature should be maintained for a period of from about 4 hours to 30 hours, preferably from 10 to 25 hours, and most preferably for 15 to 25 hours. The combination of ultimate temperature and the length of time at that temperature will be determined by catalyst type and amount. The combination of temperature and time should be sufficient to decompose, volatilize, disproportionate, or otherwise render the catalyst substantially non-reactive, most especially to air.

More preferred, the catalyst is raised from ambient temperature to about 100° C., using a gradual temperature increase of an average of 5° C. per hour, and more preferably about 10° C. per hour.

Following the temperature rise to about 100° C., the temperature is held for up to about 10 hours, preferably up to about 5 hours, more preferably up to about 2 hours, or a sufficient time to ensure that substantially all of the hydrocarbons are volatilized.

The catalyst temperature is then raised in timed increments, for example, about 10° C. per hour, until the maximum desired temperature is achieved. Throughout the heating process, in addition to volatilization, disproportionation, decomposition, and thermal decomposition occur.

For purposes of this invention, decomposition shall be defined as a fundamental type of chemical change. In simple decomposition, one substance breaks down into two simpler substances, e.g., water yields hydrogen and oxygen. In double decomposition, two compounds break down and recombine to form two different compounds.

Thermal decomposition shall be defined as heating in the absence of air.

At the maximum temperature, the catalyst is held for a period of at least 4 hours. The minimum holding time being defined by determination that substantially all reactions are completed or substantially completed. Completion being defined as the active compounds being substantially decomposed, that is the decomposition reactions are carried to completion. For example, if after 4 hours all active compounds have been thermally decomposed, holding for longer periods is merely a matter of convenience and/or energy consumption.

In most cases, dependent upon catalyst type and amount, the maximum time period for holding at the maximum temperature will be up to about 48 hours, preferably up to about 24 hours, and more preferably up to about 12 hours. The criteria for determining the length of time is dependent upon the thermal decomposition reactions known or thought to be controlling. Those skilled in the art will appreciate that other time and temperature combinations may achieve the desired end result of a deactivated catalyst.

The exact composition of the active species responsible for olefin polymerization is not known. However, during the heating of the catalyst in the deactivation process, complexes are decomposed and formed. The conditions for complex formation and stabilities are well known. Such complex formation, decomposition and disproportionation are the result of active catalyst component compounds reacting to heat.

Examples of the controlling reactions, in deactivation of a typical gas phase fluidized bed reaction for production of polyethylene, the following reactions may be controlling in the decomposition of the catalyst:

Disproportionation:

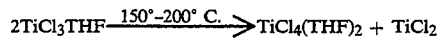

Thermal decomposition:

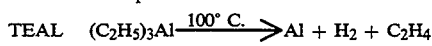

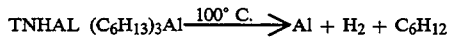

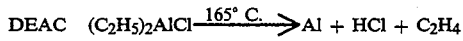

The maximum temperature reached must at least provide, that substantially all of the thermal decomposition devolatilizing, and disproportionation has occurred. This temperature will be generally from about 150° C. to about 1000° C., preferably about 180° C. to about 500° C., more preferably from about 180° C. to about 300° C. The process should be carried out such that neither the heating nor subsequent combustion of the volatiles in a flare, cause substantial formation of unacceptable materials, as for instance, chlorinated hydrocarbons.

Illustrative, non-limiting examples of the features and practice of the invention are set forth below.

EXAMPLE 1

100 grams of an active dry catalyst was heated in a 500 cc, stainless steel vessel, using a fitted heating mantle. A diagram of the experimental equipment is shown in FIG. 1. The catalyst was a mixture of $MgCl_2$, $TiCl_{3.1}$. $/3AlCl_3$, tetrahydrofuran (THF), diethyl aluminum chloride $(C_2H_5)_2AlCl$ (DEAC), trinormal hexyl aluminum (THNAL), triethyl aluminum $(C_2H_5)_3Al$ (TEAL), silicon dioxide ($SiO_2$) and isopentane. A description of a method of making this catalyst is described in European Patent Application Number EPO 369 436 A2.

Vapors or by-products from the heat treatment of the catalyst were collected in a 75 cc stainless steel vessel cooled to −78° C. using a dry ice/acetone bath. Heating tape was wrapped around the tubing leading to the cold trap to prevent vapor condensation in the lines. Two glass vessels, each containing 100 cc of a 10 weight percent NaOH solution were connected in series to trap any HCl gases evolved.

The catalyst was subjected to a heat treatment of 200° C. under a nitrogen flow for 24 hours. After cooling to room temperature, the tared vessel containing the catalyst was weighed and the remaining catalyst was weighed and the catalyst weight loss determined. The cold trap was isolated and its contents weighed. Samples from the caustic solution were analyzed, the analysis is shown in Table 1. A sample of the catalyst heated under nitrogen was also analyzed. The results are shown in Tables 2 and 3.

The original experimental set-up was reassembled using a new cold trap and caustic solutions, and an air flow at room temperature was passed over the catalyst for 24 hours. Deactivated catalyst and caustic solution samples were analyzed, the results are shown in Tables 2 and 3.

EXAMPLES 2

Figure 2:
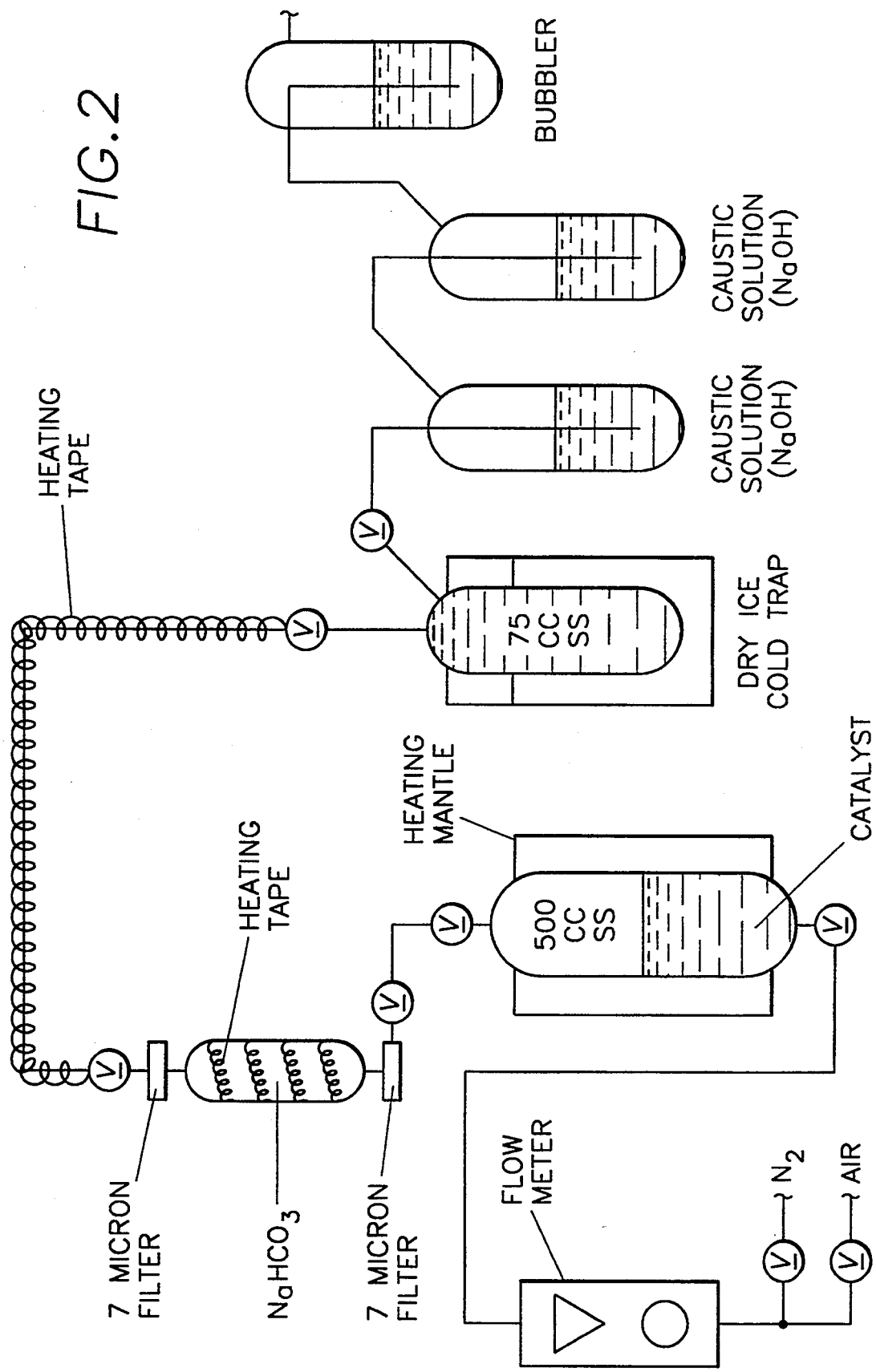
FIG. 2 shows a schematic of a second catalyst deactivation process, incorporating a further preferred embodiment of the present invention, relating to Experiment II.

Example 2 was similar to Example 1, except that a $NaHCO_3$ bed was installed between the catalyst vessel and the dry ice/acetone cold trap as shown in FIG. 2. The catalyst was subjected to the same thermal treatment/deactivation process as described in Example 1, and samples were analyzed after the same time periods and temperature conditions as Example 1. The results of the analysis are shown in Table 2.

TABLE 1

| SAMPLE | DESCRIPTION | pH | Cl ppm |
|---|---|---|---|
| 1 | First caustic after $N_2$/heat cycle | 13.5 | <20 |
| 2 | Second caustic after $N_2$/heat cycle | 13.5 | <20 |
| 3 | First caustic after air purge | 13.47 | <20 |
| 4 | Second caustic after air purge | 13.57 | <20 |
|  | Control (caustic) | 13.57 | <20 |

TABLE 2

COMPOUND ANALYSES OF CATALYST SAMPLES

| Description | C | H | Cl | Al | Mg | Ti |
|---|---|---|---|---|---|---|
| Starting Catalyst | 17.99 | 2.97 | 10.91 | 4.35 | 1.76 | 1.06 |
| After $N_2$/Heat Cycle No $NaHCO_3$ (Example 1) | 5.96 | 0.62 | 12.32 | 4.09 | 1.75 | 1.21 |
| After Air/RT Purge No $NaHCO_3$ (Example 1) | 6.96 | 0.91 | 12.22 | 5.01 | 1.84 | 1.22 |
| After $N_2$/Heat Cycle through $NaHCO_3$ bed (Example 2) | 7.89 | 0.82 | 11.74 | 3.93 | 1.77 | 0.96 |
| After Air/RT Purge through $NaHCO_3$ bed (Example 2) | 9.37 | 1.54 | 11.15 | 4.66 | 1.75 | 1.14 |

TABLE 3

COMPOSITION OF CATALYST BEFORE AND AFTER DEACTIVATION[1]

| Compound | Weight Percent[2] before | Weight Percent[2] after | Mole Percent before | Mole Percent after | Mole Ratio before | Mole Ratio after |
|---|---|---|---|---|---|---|
| Ti | 1.06 | 1.22 | 0.022 | 0.025 | 1.00 | 1.00 |
| Mg | 1.76 | 1.84 | 0.072 | 0.076 | 3.27 | 3.04 |
| Al | 4.35 | 5.01 | 0.161 | 0.186 | 7.32 | 7.44 |
| Cl | 10.91 | 12.22 | 0.308 | 0.345 | 14.00 | 13.80 |
| THF | 13.00 | 1.30 | 0.181 | 0.018 | 8.20 | 0.72 |

| Before Deactivation | After Deactivation |
|---|---|
| $TiMg_{3.27}Al_{7.32}Cl_{14.00}(THF)_{8.20}$ | $TiMg_{3.04}Al_{7.44}Cl_{13.80}(THF)_{0.72}$ |

[1] Final deactivated catalyst air purged.
[2] Silica and free hydrocarbons not included.

EXAMPLE 3

99.1 grams of catalyst [bis(n-butyl-cyclopentadienyl)-zirconium dichloride/methylalumoxane/silica] was added to a 500 cc stainless steel cylinders. The catalyst was heated slowly under a stream of nitrogen from 40° C. to 200° C. in 3 hours and maintained at 200° C. for another 20 hours. The vent of the apparatus was connected to a dry ice/acetone cold trap in which all vented materials were collected. The weight of materials collected in the cold trap was found to be 11.3 grams. The weight of the catalyst in the 500 cc stainless steel cylinder after heating under $N_2$ was 87.4 grams. The catalyst weight loss of 11.7 grams was in agreement with what had been collected in the cold trap. After removing a sample for analysis, the catalyst in the cylinder was exposed to gas at room temperature, first as a 50/50 (volume ratio) $N_2$/Air mixture then as a 100% air to complete deactivation. The temperature rose by about 5° C., but no violent reaction was detected indicating that flammable, volatile hydrocarbons had been removed during the $N_2$/heating step.

Analyses of the starting and heat treated catalyst samples are shown in Table 4, indicating reduction of weight percent carbon and hydrogen in the sample respectively from 9.01 and 1.65 to 2.49 and 0.98.

TABLE 4

(WEIGHT PERCENT)

| SAMPLE | ELEMENT C | H | Zr | Al |
|---|---|---|---|---|
| Starting Catalyst (Example 3) | 9.01 | 1.65 | 0.31 | 7.23 |
| Catalyst of Example 3 + heat + $N_2$ | 5.88 | 1.32 | 0.32 | 7.35 |
| Catalyst of Example 3 + heat + $N_2$ + air | 2.49 | 0.98 | 0.30 | 7.12 |

Those skilled in the art will appreciate that the processes described in Examples 1, 2 and 3 can be scaled up to deactivate catalysts in commercial quantities.

DISCUSSION

A schematic of the products and intermediates formed during the deactivation process is shown below:

The following is a description of the product distribution found as a result of a process similar to Examples 1 and 2.

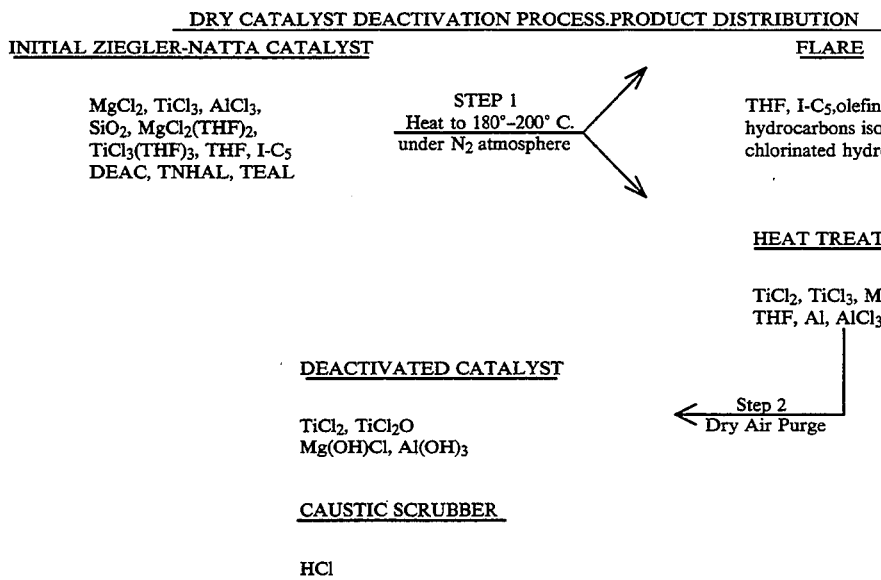

DRY CATALYST DEACTIVATION PROCESS.PRODUCT DISTRIBUTION

During heating in a nitrogen atmosphere, the aluminum alkyls are decomposed, $TiCl_3$ is converted to $TiCl_2$, and THF and other hydrocarbons are removed. After heating (in the presence of nitrogen), the catalyst loses some or all of its activity and upon exposure to air, no violent reaction takes place.

Samples of the catalyst were analyzed for metal content at the end of step 1 and step 2 of the deactivation process, the results are presented in Table 2.

As seen in FIGS. 1 and 2, two caustic solution gas bubblers were set up in series to trap and measure any gaseous HCl evolved during catalyst decomposition. pH measurements and chloride analysis indicate that very little HCl is given off during the deactivation process. (Table 1)

After complete deactivation, the catalyst lost 20% of its weight.

The liquid and gas collected by dry ice/acetone condensation weighed 15.4 grams. The amount of material not accounted for is assumed to be light hydrocarbons and HCl. Distribution of the gas not accounted for and liquid caught in the trap is 23 and 77 weight percent respectively. The gaseous and liquid products were analyzed by gas chromatography and mass spectrometer for identification. Results are shown in Table 5.

TABLE 5

| Type | Amount (weight %) |
|---|---|
| LIQUID ANALYSIS | |
| Saturated and olefinic hydrocarbons | 84.0–89.0 |
| THF | 12.5–7.2 |
| Aromatics, chlorinated hydrocarbons | 3.5–3.8 |
| TOTAL | 100.0–100.0 |
| GASEOUS SAMPLES | |
| $C_2$–$C_4$ hydrocarbons | 65.8–76.1 |

TABLE 5-continued

| Type | Amount (weight %) |
|---|---|
| $C_2$–$C_6$ total | 98.8–99.6 |

Considering both the gaseous and liquid components as part of the 20 percent weight loss, the following split was calculated:

| Component | Amount (weight %) |
|---|---|
| Saturated and olefinic hydrocarbons | 87.7–91.5 |
| THF | 9.6–5.6 |
| Aromatics, Chlorinated hydrocarbons, other | 2.7–2.9 |
| TOTAL | 100.0–100.0 |

Hypothetical commercial dry polyolefin transition metal catalyst deactivation.

An analysis of transition metal polyolefin catalyst hypothetically scaled up from an example in European Patent application EP 369 436 A2 is shown in Table 6.

Catalyst components and weight:

TABLE 6

| COMPONENT | WEIGHT |
|---|---|
| Silica | 700 lbs (318.18 kg) |
| TEAL | 33 lbs (15 kg) |
| $MgCl_2$ | 75 lbs (34.09 kg) |
| $TiCl_3$.$AlCl_3$ | 50 lbs (27.72 kg) |
| THF | 152 lbs (69 kg) |
| CATALYST PRECURSOR | 1010 lbs (459 kg) |
| TNHAL | 178 lbs (80.9 kg) |
| DEAC | 127 lbs (57.72 kg) |
| Isopentane | 20 lbs (9.09 kg) |
| FINAL CATALYST | 1335 lbs (606.81 kg) |

Utilizing a process as described by the present invention, treating the above hypothetical catalyst, the free hydrocarbons and hydrocarbons/chemicals generated from reactions taking place under the thermal conditions of our invention have been shown above.

The maximum amount of volatile chemicals expected to be generated during nitrogen heat treatment of the catalyst are shown in Table 6.

TABLE 7

| CHEMICAL | CALCULATED AMOUNT lbs (kg) | SOURCE |
| --- | --- | --- |
| $H_2$ | 4 (1.8) | TEAL, THNAL, DEAC |
| Ethylene | 80 (36.3) | TEAL, DEAC |
| Isopentane | 20 (9.1) | free isopentane |
| Hexene | 159 (72.2) | TNHAL |
| THF | 152 (69.1) | free and complex THF |
| HCl | 38 (17.2) | DEAC |

The non-volatiles, as discussed above, may be treated with air and subsequently safely disposed of.

COMPARATIVE DATA

Similar catalyst constituents as discussed in Examples 1 and 2 were deactivated by a conventional means in a commercial facility. Deactivation involved flooding the catalyst with water and disposing of the water and the solids. The data in the Table shows the range of analysis of results from multiple commercial deactivations. Water, after use in the deactivation process, had a flash point below 140° F. (60° C.) and a pH below 5.

Analysis of water deactivated catalyst:

TABLE 8

| CHEMICAL | RANGE* |
| --- | --- |
| $TiO_2$ | 0.6–0.8 |
| $Al_2O_3$ | 3.0–4.0 |
| Mg(OH)Cl | 1.5–2.0 |
| $SiO_2$ | 20.0–28.0 |
| HCl (in solution) | 3.0–4.0 |
| Tetrahydrofuran | 1.0–6.0 |
| Hexanes | 1.0–6.0 |
| Water | 70.0–60.0 |

*(weight percent based on the total weight of water plus catalyst)
Flashpoint 90–110° F. (32–43° C.); pH 3.2

As can be seen from Table 8, the conventional catalyst deactivation by water, leaves the water/catalyst mix with constituents that might be classified as hazardous, requiring expensive disposal methods.

The preferred embodiments of the present invention have been described above. It should be understood that the foregoing description is intended only to illustrate certain preferred embodiments of the invention, and is not intended to define the invention in any way. Other embodiments of the invention can be employed without departing from the full scope of the invention as set forth in the appended claims.

We claim:

1. A transition metal catalyst deactivation process comprising:
   (a) heating a transition metal catalyst to about 100° C. from ambient temperature, at the rate of about 10° C. per hour;
   (b) holding the catalyst of step (a) at a temperature in the range of from about 90° to about 110° C. for a time period sufficient to volatilize substantially all hydrocarbons;
   (c) heating the catalyst of step (b) to a temperature of about 200° C. said heating taking place at the rate of about 10° C. per hour;
   (d) holding the catalyst of step (c) at a temperature of from about 180° C. to about 300° C. for a period in the range of from about 4 hours to about 30 hours.
   (e) cooling the catalyst of step (d); and
   (f) exposing the catalyst of step (e) to air; wherein said catalyst is selected from the group consisting of a Ziegler-Natta catalyst, a Ziegler-Natta catalyst component, a metallocene catalyst, and a metallocene-alumoxane catalyst component;
   said heating taking place in an environment substantially free from air, oxygen and water.

2. A deactivated transition metal catalyst prepared by a process comprising:
   (a) heating an active transition metal catalyst to a temperature sufficient to volatilize substantially all hydrocarbons, and sufficient to effect decomposition of substantially all active compounds, said temperature being in the range of from about 100° C. to about 1000° C., at a rate of about 10° C. per hour;
   (b) holding the product of step (a) at about a maximum temperature reached in step (a) for a time period in the range of from about 4 to about 30 hours; wherein said transition metal catalyst is selected from the group consisting of a Ziegler-Natta catalyst, a Ziegler-Natta catalyst system, a Ziegler-Natta catalyst component, a metallocene catalyst, a metallocene-alumoxane catalyst system, and a metallocene-alumoxane catalyst system component.

3. A method for producing a deactivated transition metal catalyst, comprising:
   (a) heating a transition metal catalyst, above about 100° C. in an environment, said environment having insufficient amounts of elements or compounds or combinations thereof to cause combustion of the transition metal polyolefin catalyst; and
   (b) exposing said catalyst of step (a) to air; wherein said catalyst of step (a) is selected from the group consisting of a Ziegler-Natta catalyst, a Ziegler-Natta catalyst component, a metallocene catalyst, and a metallocene-alumoxane catalyst.

4. A method of producing a substantially environmentally neutral waste from a transition metal catalyst, comprising;
   (a) placing a transition metal catalyst in an environment substantially free from components that spontaneously react with said catalyst;
   (b) heating said catalyst of step (a) to a temperature in the range from about 30° C. to about 300° C.; and
   (c) exposing said catalyst of step (b) to air; wherein said catalyst selected from the group consisting of a metallocene catalyst, components of a metallocene catalyst, a Ziegler-Natta catalyst, and components of a Ziegler-Natta catalyst.

5. A method of producing a substantially environmentally neutral waste as recited in claim 4 wherein said heating comprises a heat rise of about 10° C. per hour, until a maximum temperature sufficient to volatilize the volatile compounds, and sufficient to cause complex formation, disproportionation or other decomposition of the active, non-volatile catalyst system components is reached, after which the maximum temperature is maintained in the range of from about 10 to about 48 hours.

6. A deactivation process for a transition metal catalyst, comprising heating a transition metal catalyst system to a temperature sufficient to decompose active compounds in said catalyst system, said temperature being sufficient to drive off volatile compounds, said heating being carried out in a manner to substantially eliminate combustion or violent reaction upon exposure of the catalyst to air, wherein said transition metal catalyst is selected from the group consisting of a Ziegler-Natta catalyst system and a metallocene catalyst.

7. A method for deactivating a transition metal catalyst, said method comprising:
(a) placing a transition metal catalyst in a vessel;
(b) heating said catalyst to achieve at least a partial decomposition of said catalyst and to volatilize substantially all volatile materials in said vessel; and
(c) transferring substantially all non-solid materials from step (b) to a means for safety disposing of said non-solid materials, wherein said transition metal catalyst is selected from the group consisting of a metallocene catalyst, components of a metallocene catalyst, a Ziegler-Natta catalyst, and components of a Ziegler-Natta catalyst.

8. A method as recited in claim 7, comprising the further step of exposing the solid materials to air.

9. A method as recited in claim 7 wherein said heating takes place in a controlled amount of one of water or oxygen.

* * * * *